(12) United States Patent
Matsumoto et al.

(10) Patent No.: US 11,048,533 B2
(45) Date of Patent: Jun. 29, 2021

(54) INFORMATION PROCESSING DEVICE AND METHOD FOR SELECTIVELY DISPLAYING SUPPORT INFORMATION BASED ON URGENCY LEVEL

(71) Applicant: NTT DOCOMO, INC., Tokyo (JP)

(72) Inventors: Nozomi Matsumoto, Tokyo (JP); Motoya Takahashi, Tokyo (JP); Sumin Kwak, Tokyo (JP); Yuuki Fukuyoshi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/092,590

(22) PCT Filed: Apr. 18, 2017

(86) PCT No.: PCT/JP2017/015626
§ 371 (c)(1),
(2) Date: Oct. 10, 2018

(87) PCT Pub. No.: WO2017/195544
PCT Pub. Date: Nov. 16, 2017

(65) Prior Publication Data
US 2019/0121653 A1   Apr. 25, 2019

(30) Foreign Application Priority Data

May 10, 2016   (JP) .............................. JP2016-094566

(51) Int. Cl.
*G06F 9/451*   (2018.01)
*G06F 3/0481*   (2013.01)
(Continued)

(52) U.S. Cl.
CPC ............ *G06F 9/453* (2018.02); *G06F 3/0481* (2013.01); *G06F 3/0484* (2013.01); *G06F 11/3438* (2013.01)

(58) Field of Classification Search
CPC ...... G06F 3/0481; G06F 3/0484; G06F 9/453; G06F 11/3438
See application file for complete search history.

(56) References Cited

U.S. PATENT DOCUMENTS 4,964,077 A * 10/1990 Eisen ...................... G06F 9/453
715/707
5,465,358 A * 11/1995 Blades .................. G06F 3/0489
715/707
(Continued)

FOREIGN PATENT DOCUMENTS

| JP | 2000148332 A | 5/2000 |
|----|--------------|--------|
| JP | 2003140798 A | 5/2003 |

(Continued)

OTHER PUBLICATIONS

Daniela Angelucci et al., "Designing a glanceable peripheral display for severity-based multiple alarm notification," May 2009, IEEE, HSI 2009, pp. 242-246. (Year: 2009).*

(Continued)

*Primary Examiner* — Dino Kujundzic
(74) *Attorney, Agent, or Firm* — MKG, LLC

(57) ABSTRACT

Proficiency level determining unit determines a user's proficiency level in operating his/her user device. Suggestion determining unit determines a suggestion to be disclosed, based on a trigger that has occurred. Suggestion type determining unit determines a type of the suggestion determined to be displayed by suggestion determining unit. Display method determining unit determines a display method of the suggestion based on the suggestion type determined by suggestion type determining unit, among display methods that differ in a method by which the user may operate the user device after a suggestion is displayed. Suggestion display control unit causes a display means of the user device to display the suggestion determined by suggestion (Continued)

| Suggestion type | Operation state | Display method |
|---|---|---|
| Urgency level: low | In-operation state | No display |
| | Non-operation state | Suggestion button display |
| Urgency level: middle | In-operation state | Suggestion button display |
| | Non-operation state | Overlapping suggestion display |
| Urgency level: high | In-operation state | Overlapping suggestion display |
| | Non-operation state | Overlapping-suggestion and operation restrictive display | determining unit using the display method determined by display method determining unit.

15 Claims, 10 Drawing Sheets

(51) Int. Cl.
*G06F 3/0484* (2013.01)
*G06F 11/34* (2006.01)

(56) References Cited

U.S. PATENT DOCUMENTS

| | | | |
|---|---|---|---|
| 5,978,595 A | 11/1999 | Tanaka et al. | |
| 6,970,923 B1* | 11/2005 | Mukaiyama | G06F 3/1204 |
| | | | 358/1.15 |
| 7,743,340 B2* | 6/2010 | Horvitz | G05B 19/404 |
| | | | 715/808 |
| 9,542,063 B1* | 1/2017 | Marchant | G06F 11/00 |
| 9,641,989 B1* | 5/2017 | Dietrich | H04N 21/4882 |
| 2002/0126140 A1 | 9/2002 | Gorbet et al. | |
| 2006/0080571 A1* | 4/2006 | Ichinowatari | G06F 11/328 |
| | | | 714/4.1 |
| 2007/0214429 A1* | 9/2007 | Lyudovyk | G06F 3/048 |
| | | | 715/772 |
| 2009/0009793 A1* | 1/2009 | Ozawa | H04N 1/00482 |
| | | | 358/1.15 |
| 2010/0287275 A1 | 11/2010 | Inoue et al. | |
| 2014/0019914 A1* | 1/2014 | Amano | G06F 3/0482 |
| | | | 715/825 |
| 2014/0089824 A1* | 3/2014 | George | G06F 8/38 |
| | | | 715/762 |
| 2015/0121219 A1* | 4/2015 | Baklanovs | G06F 16/22 |
| | | | 715/712 |
| 2015/0199229 A1* | 7/2015 | Amendjian | G06F 16/9558 |
| | | | 714/57 |
| 2015/0286487 A1* | 10/2015 | Glass | H04M 3/51 |
| | | | 715/707 |
| 2016/0132192 A1* | 5/2016 | Sutton | G06F 3/04817 |
| | | | 715/719 |

FOREIGN PATENT DOCUMENTS

| | | |
|---|---|---|
| JP | 2004194069 A | 7/2004 |
| JP | 2004355400 A | 12/2004 |
| JP | 2010108393 A | 5/2010 |
| JP | 2012089940 A | 5/2012 |
| JP | 2015143948 A | 8/2015 |
| WO | 2014068791 A1 | 5/2014 |

OTHER PUBLICATIONS

International Search Report issued in corresponding PCT Application No. PCT/JP2017/015626 dated Jul. 18, 2017, 4 pages.
Extended European Search Report issued in corresponding European Application No. 17795905.3 dated Mar. 15, 2019, 8 pages.
Notice of Reasons of Refusal issued in corresponding Japanese Patent Application No. 2018-516911, dated Dec. 3, 2019.
Notice of Reasons of Refusal issued in corresponding Japanese Patent Application No. 2018-516911, dated Feb. 18, 2020, 7 pages.
Official Communication issued in corresponding European Patent Application No. 17795905.3, dated May 27, 2020, 9 pages.
Summons to Attend Oral Proceedings issued in corresponding European Patent Application No. 17795905.3, dated Feb. 17, 2021.

* cited by examiner

FIG. 1

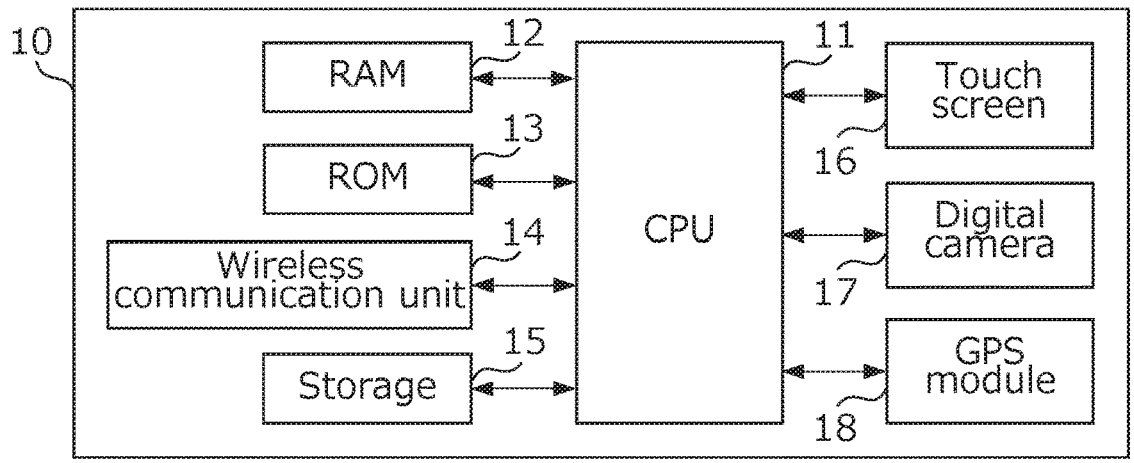

FIG. 2

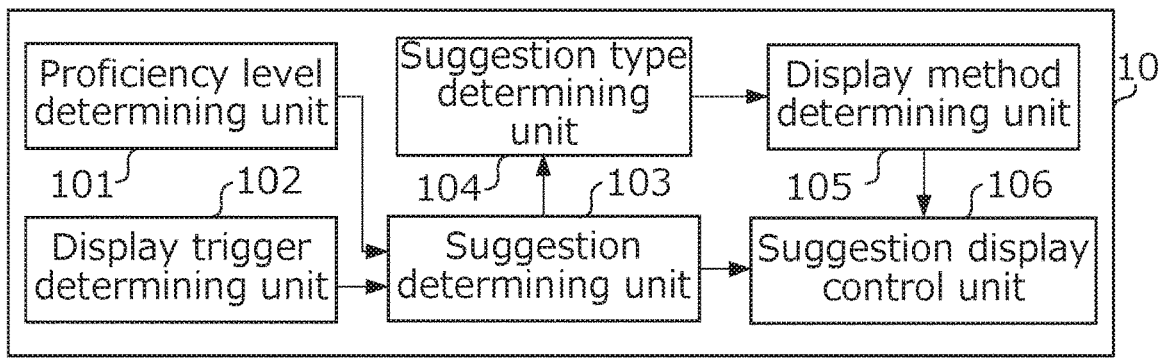

FIG. 3

| Trigger | Proficiency level | Suggestion |
|---|---|---|
| Start of translation application | Beginner | Method of using basic functions |
| | Intermediate user | Method of using advanced functions |
| | Advanced user | Method of customizing dictionary |
| Remaining storage capacity is less than 10% | Beginner | Suggestion of deleting data |
| | Intermediate user | Suggestion of moving data to the outside |
| | Advanced user | Suggestion of compressing data |
| Remaining battery level is less than 15% | Beginner | Alert and suggestion of setting power-saving mode |
| | Intermediate user | Alert and suggestion of changing screen brightness |
| | Advanced user | Alert only |
| ... | ... | ... |

FIG. 4

| Suggestion | Urgency level |
|---|---|
| Method of using basic functions | low |
| Method of using advanced functions | low |
| Method of customizing dictionary | low |
| Suggestion of deleting data | middle |
| Suggestion of moving data to the outside | low |
| Suggestion of compressing data | low |
| Alert and suggestion of setting power-saving mode | high |
| Alert and suggestion of changing screen brightness | high |
| Alert only | middle |
| ... | ... |

FIG. 5

| Suggestion type | Display method |
|---|---|
| Urgency level: low | Suggestion button display |
| Urgency level: middle | Overlapping suggestion display |
| Urgency level: high | Overlapping-suggestion and operation restrictive display |

FIG. 6

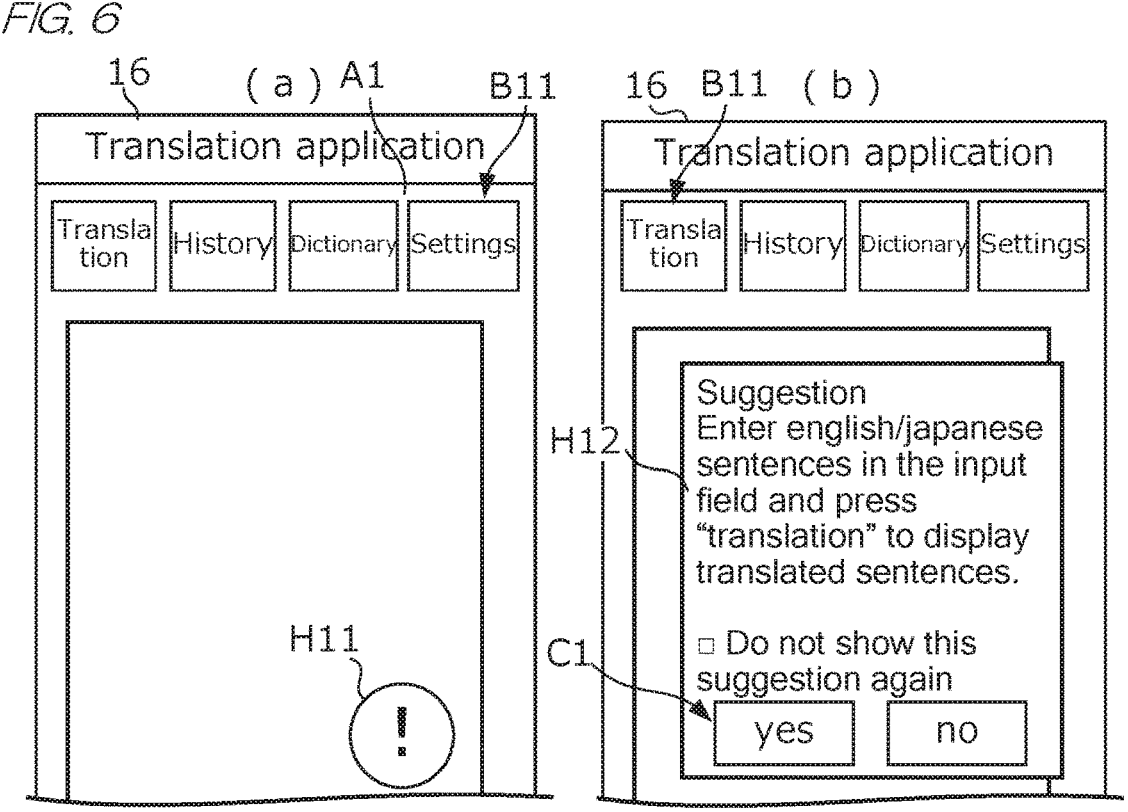

FIG. 11

| Suggestion type | Operation state | Display method |
|---|---|---|
| Urgency level: low | In-operation state | No display |
| | Non-operation state | Suggestion button display |
| Urgency level: middle | In-operation state | Suggestion button display |
| | Non-operation state | Overlapping suggestion display |
| Urgency level: high | In-operation state | Overlapping suggestion display |
| | Non-operation state | Overlapping-suggestion and operation restrictive display |

FIG. 12

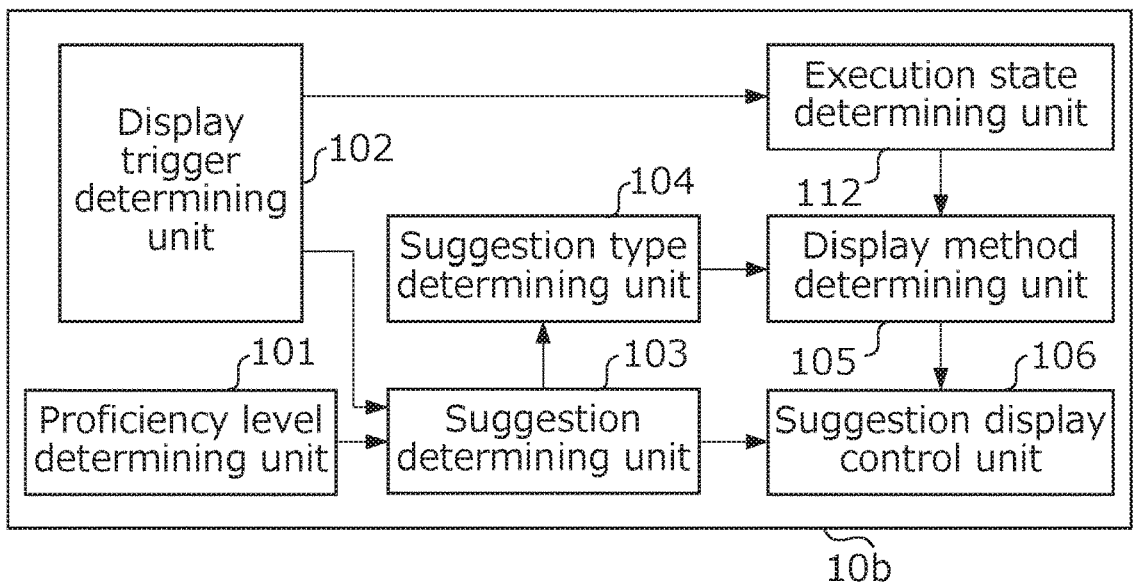

FIG. 13

| Suggestion type | Execution state | Display method |
|---|---|---|
| Urgency level: low | Running state | No display |
| | Non-execution state | Suggestion button display |
| Urgency level: middle | Running state | Suggestion button display |
| | Non-execution state | Overlapping suggestion display |
| Urgency level: high | Running state | Overlapping suggestion display |
| | Non-execution state | Overlapping-suggestion and operation restrictive display |

FIG. 18

| Suggestion type | User-related information | Display method |
|---|---|---|
| Urgency level: low | Proficiency level: low | Overlapping suggestion display |
| | Proficiency level: middle | Suggestion button display |
| | Proficiency level: high | No display |
| Urgency level: middle | Proficiency level: low | Overlapping-suggestion and operation restrictive display |
| | Proficiency level: middle | Overlapping suggestion display |
| | Proficiency level: high | Suggestion button display |
| Urgency level: high | Proficiency level: low | Overlapping-suggestion and operation restrictive display |
| | Proficiency level: middle | Overlapping-suggestion and operation restrictive display |
| | Proficiency level: high | Overlapping suggestion display |

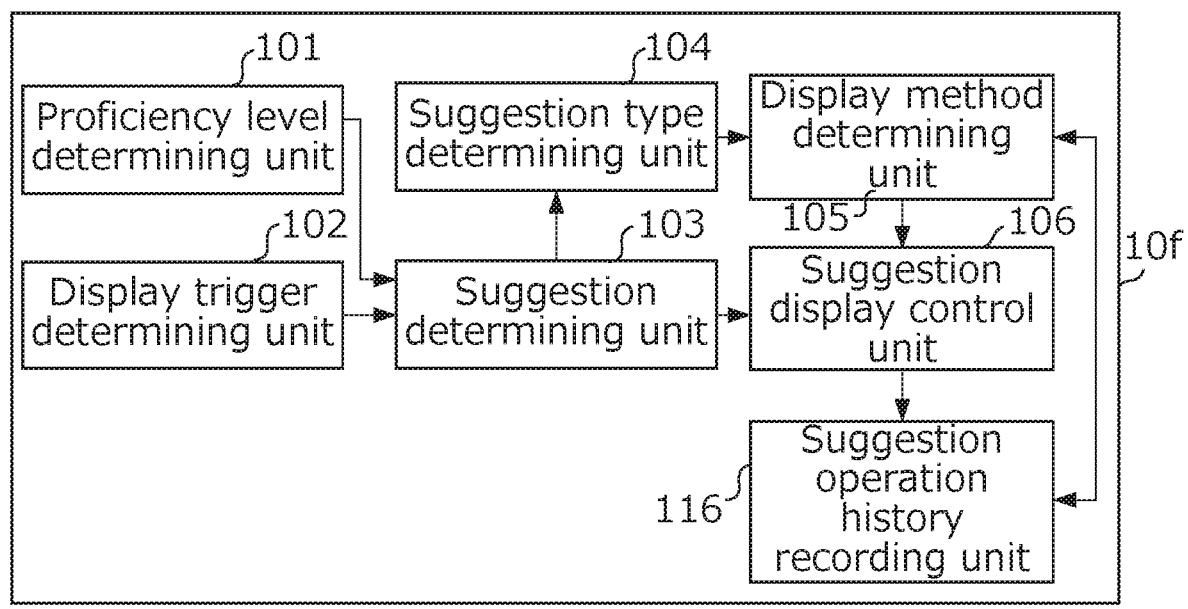

| Suggestion type | Operation matching degree | Display method |
|---|---|---|
| Urgency level: low | low | Overlapping suggestion display |
| | middle | Suggestion button display |
| | high | No display |
| Urgency level: middle | low | Overlapping-suggestion and operation restrictive display |
| | middle | Overlapping suggestion display |
| | high | Suggestion button display |
| Urgency level: high | low | Overlapping-suggestion and operation restrictive display |
| | middle | Overlapping-suggestion and operation restrictive display |
| | high | Overlapping suggestion display |

FIG. 21

| Suggestion type | Specific operation amount | Display method |
|---|---|---|
| Urgency level: low | Not less than threshold value Th21 | No display |
| | Less than threshold value Th21 | Suggestion button display |
| Urgency level: middle | Not less than threshold value Th21 | Suggestion button display |
| | Less than threshold value Th21 | Overlapping suggestion display |
| Urgency level: high | Not less than threshold value Th21 | Overlapping suggestion display |
| | Less than threshold value Th21 | Overlapping-suggestion and operation restrictive display |

FIG. 22

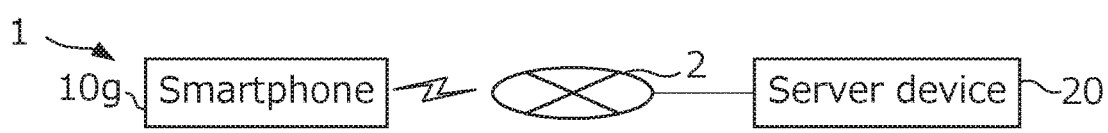

FIG. 23

INFORMATION PROCESSING DEVICE AND METHOD FOR SELECTIVELY DISPLAYING SUPPORT INFORMATION BASED ON URGENCY LEVEL

TECHNICAL FIELD

The present invention relates to a technique for displaying support information that supports a user's operation of a device.

BACKGROUND

There is known in the art a technique for displaying support information that supports a user's operation of a device. For example, JP 2015-143948 A1 discloses a technique for, when an abnormality occurs in an electrical device, identifying a mobile device having a highest priority for reporting the abnormality, and notifying the identified mobile device of the abnormality.

SUMMARY

When displaying support information to support a user's operation of a device, it is desirable that the support information is seen by a user; however, the support information may hide other displayed information from the user's view.

In view of this, it is an object of the present invention to enable selective use of display methods of user support information.

To achieve the object, the present invention provides a processing device, comprising: a type determining unit configured to determine a type of support information that supports a user in operating a user device; a determining unit configured to determine a display method of the support information based on the determined type of the support information; and a display control unit configured to cause the support information to be displayed using the determined display method.

The determining unit may be configured to determine, based on the determined type, one of display methods that differ in a method by which the user may operate the user device after support information is displayed.

The processing device may further comprise a first detecting unit configured to detect an operation state of the user device, and the determining unit may be configured to determine a display method of the support information based on not only the determined type but also the detected operation state.

The processing device may further comprise a second detecting unit configured to detect an execution state of a program in the user device, and the determining unit may be configured to determine a display method of the support information based on not only the determined type but also the detected execution state.

The display control unit may be configured to perform display controls of support information simultaneously, the processing device may further comprise a similarity determining unit configured to determine whether support information determined to be displayed is similar to displayed support information, and the display control unit may be configured to refrain from causing support information determined to be similar to displayed support information by the similarity determining unit.

The processing device may further comprise a browsing determining unit configured to determine whether displayed support information has been browsed, and the display control unit may be configured to cause support information to be displayed, the support information having been determined to be similar to displayed information, the displayed information having been determined not to have been browsed.

The processing device may further comprise an acquiring unit configured to acquire information related to the user of the user device, and the determining unit may be configured to determine a display method of the support information based on not only the determined type but also the acquired information related to the user.

The processing device may further comprise a recording unit configured to record a history of a user's operations in response to displayed support information, and the determining unit may be configured to determine a display method of the support information based on not only the determined type but also the recorded history.

The present invention also provides an information-processing system, comprising: a type determining unit configured to determine a type of support information that supports a user in operating a user device; a determining unit configured to determine a display method of the support information based on the determined type of the support information; and a display control unit configured to cause the support information to be displayed using the determined display method.

The present invention also provides a processing method, comprising: determining a type of support information that supports a user in operating a user device; determining a display method of the support information based on the determined type of the support information; and causing the support information to be displayed using the determined display method.

The present invention makes it possible to use display methods of user support information selectively.

BRIEF DESCRIPTION OF THE DRAWINGS

FIG. 1 is a diagram showing a hardware configuration of smartphone 10 according to a first embodiment.

FIG. 2 is a diagram showing a functional configuration provided in the first embodiment.

FIG. 3 is a diagram showing an example of a suggestion table.

FIG. 4 is a diagram showing an example of a suggestion type table.

FIG. 5 is a diagram showing an example of a display method table.

FIG. 6 is a diagram showing an example of a suggestion button display.

FIG. 11 is a diagram showing an example of a display method table.

FIG. 12 is a diagram showing another example of a functional configuration provided in the second embodiment.

FIG. 13 is a diagram showing another example of a display method table.

FIG. 18 is a diagram showing an example of a display method table.

FIG. 19 is a diagram showing an example of a functional configuration provided in a fifth embodiment.

FIG. 20 is a diagram showing an example of a display method table.

FIG. 21 is a diagram showing an example of a display method table according to a modified example.

FIG. 22 is a diagram showing a configuration of an information-processing system according to a modified example.

FIG. 23 is a diagram showing a hardware configuration of a server device.

DETAILED DESCRIPTION

Figure 7:
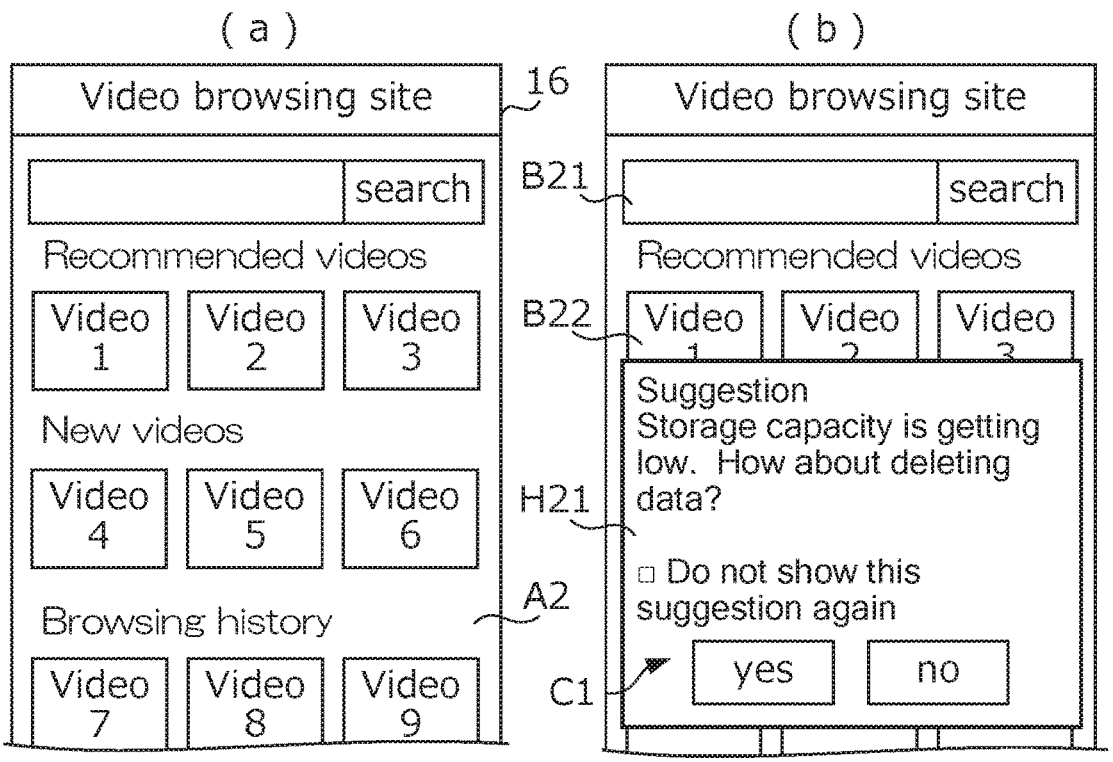
FIG. 7 is a diagram showing an example of an overlapping suggestion display.

The present invention is aimed at providing a user of a user device such as a smartphone with a suggestion in accordance with the user's proficiency level (for example, a beginner, intermediate, or advanced user level) in operating the user device so that s/he can operate the user device comfortably. The suggestion herein refers to, for example, information on an operation method adapted to a screen being displayed, or information on an operation recommended when a storage capacity or battery charge level is getting low. The suggestion is an example of support information that supports a user in operating the user device. Below, embodiments of the present invention will be described.

First Embodiment

FIG. 1 shows a hardware configuration of smartphone 10 according to a first embodiment. Smartphone 10 is a user device having a function of determining a proficiency level in operating the user device and a function of displaying a suggestion corresponding to a determined proficiency level. Smartphone 10 is a computer including CPU (Central Processing Unit) 11, RAM (Random Access Memory) 12, ROM (Read Only Memory) 13, wireless communication unit 14, storage 15, touch screen 16, digital camera 17, and GPS (Global Positioning System) module 18.

CPU 11 is a processing device that performs various processes by executing a program stored in ROM 13 or storage 15 by use of RAM 12 as a work area. CPU 11 is also a control device that controls components of smartphone 10 by performing various processes. Wireless communication unit 14 includes communication circuits for performing wireless communication compliant with mobile communication and for performing wireless communication compliant with wireless LAN (Local Area Network), so as to communicate with an external device via network 2. Storage 15 is a storage means such as a flash memory, and stores data and programs used by CPU 11 for control purposes.

Touch screen 16 includes a display, which is a display means of smartphone 10, and a touch panel provided on the surface of the display. Touch screen 16 displays images and accepts a user's operations. Digital camera 17 includes a lens and an image sensor, and captures an image of a person or scene represented by a light incident from the lens. GPS module 18 includes a sensor that measures a position of smartphone 10 based on signals from GPS satellites. GPS module 18 provides CPU 11 with position data representing a measured position with latitude and longitude.

CPU 11 executes a program to control components, thereby providing the functions described below.

FIG. 2 shows a functional configuration provided in the first embodiment. Smartphone 10 includes proficiency level determining unit 101, display trigger determining unit 102, suggestion determining unit 103, suggestion type determining unit 104, display method determining unit 105, and suggestion display control unit 106. CPU 11 that provides these functions is an example of a "processing device" according to the present invention.

Proficiency level determining unit 101 determines a user's proficiency level in operating a user device (in the present embodiment, smartphone 10). Proficiency level determining unit 101, for example, may record an operation history of smartphone 10 and determine a proficiency level based on the recorded operation history. Proficiency level determining unit 101, for example, may pre-assign a score corresponding to a level of difficulty to each operation, and determine a proficiency level that increases in proportion to a total score calculated based on the operation history. In the present embodiment, proficiency level determining unit 101 identifies, based on a total score, a level of "beginner," "intermediate user," or "advanced user" as a user's proficiency level in operating the user device. It is to be noted that a method of determining a proficiency level is not limited to the above method; any other well-known method may be used. Proficiency level determining unit 101 notifies a determined proficiency level to suggestion determining unit 103.

Display trigger determining unit 102 determines whether an event (referred to as "trigger") that prompts displaying a suggestion to a user of the user device has occurred. The trigger includes, for example, start of a particular application program, occurrence of a particular error, display of a particular web page, and execution of a particular operation. Display trigger determining unit 102 stores data on types of processing each corresponding to a trigger.

The types of processing include, for example, a processing of starting a particular application, a processing of displaying an error code indicating a particular error, a processing of displaying a particular web page, and a processing of generating operation data indicating a particular operation. When such a processing is performed on the user device, display trigger determining unit 102 determines that a corresponding trigger has occurred. Display trigger determining unit 102 periodically determines whether a trigger has occurred, and when determining that a trigger has occurred, provides trigger information indicating the trigger to suggestion determining unit 103.

Suggestion determining unit 103 determines a suggestion to be displayed, when a trigger occurs. Suggestion determining unit 103 stores a suggestion table associating a trigger, a proficiency level, and a suggestion, and determines a suggestion to be displayed, based on the suggestion table.

FIG. 3 shows an example of the suggestion table. In the suggestion table, a trigger "start of translation application" is associated with a set of a proficiency level "beginner" and a suggestion "method of using basic functions." The same trigger is also associated with another set of a proficiency level "intermediate user" and a suggestion "method of using advanced functions," and another set of a proficiency level "advanced user" and a suggestion "method of customizing dictionary." Another trigger "remaining storage capacity is less than 10%" is associated with a set of a proficiency level "beginner" and a suggestion "suggestion of deleting data," another set of a proficiency level "intermediate user" and a suggestion "suggestion of moving data to the outside," and another set of a proficiency level "advanced user" and a suggestion "suggestion of compressing data."

Another trigger "remaining battery level is less than 15%" is associated with a set of a proficiency level "beginner" and a suggestion "alert and suggestion of setting power-saving mode," another set of a proficiency level "intermediate user" and a suggestion "alert and suggestion of changing screen brightness," and another set of a proficiency level "advanced user" and a suggestion "alert only." Suggestion determining unit 103 acquires a proficiency level from proficiency level determining unit 101 and acquires trigger information from display trigger determining unit 102 to identify a suggestion to be displayed, which is associated with the acquired trigger information and proficiency level in the suggestion table. Suggestion determining unit 103 notifies the identified suggestion to suggestion type determining unit 104 and suggestion display control unit 106.

Suggestion type determining unit 104 determines a type of a suggestion determined to be displayed by suggestion determining unit 103. Suggestion type determining unit 104 is an example of a "type determining unit" according to the present invention. Suggestion type determining unit 104, in the present embodiment, determines a suggestion type among three types of a high urgency level, a middle urgency level, and a high urgency level. Suggestion type determining unit 104 pre-stores a suggestion type table associating a suggestion and an urgency level, and determines a suggestion type by use of the suggestion type table.

FIG. 4 shows an example of the suggestion type table. In the suggestion type table, a suggestion "method of using basic functions" is associated with an urgency level "low." Other suggestions "method of using advanced functions," "method of customizing dictionary," "suggestion of deleting data," "suggestion of moving data to the outside," "suggestion of compressing data," "alert and suggestion of setting power-saving mode," "alert and suggestion of changing screen brightness," and "alert only" are associated with urgency levels "low," "low," "middle," "low," "low," "high," "high," and "middle," respectively.

Suggestion type determining unit 104 acquires a suggestion to be displayed from suggestion determining unit 103 to identify an urgency level associated with the acquired suggestion in the suggestion type table, as a suggestion type. For example, when acquiring a suggestion "suggestion of deleting data," suggestion type determining unit 104 identifies an urgency level "middle" associated with the acquired suggestion in the suggestion type table, as a suggestion type. Suggestion type determining unit 104 notifies the identified type of suggestion to display method determining unit 105.

Display method determining unit 105 determines a display method of a suggestion based on a type of the suggestion determined by suggestion type determining unit 104. Display method determining unit 105 is an example of a "determining unit" according to the present invention. Display method determining unit 105, for example, may pre-store a display method table associating a suggestion type (urgency level: low, middle, high) and a display method, and determine a display method by use of the display method table.

FIG. 5 shows an example of the display method table. In the display method table, a suggestion type "urgency level: low" is associated with a display method "suggestion button display." Another suggestion type "urgency level: middle" is associated with a display method "overlapping suggestion display." Another suggestion type "urgency level: high" is associated with a display method "overlapping-suggestion and operation-restrictive display." Display method determining unit 105 acquires a suggestion type (urgency level "low," "middle," or "high") from suggestion type determining unit 104 to identify a display method associated with the acquired suggestion type in the display method table. Display method determining unit 105 notifies the identified displayed method to suggestion display control unit 106.

Suggestion display control unit 106 causes the display means of the user device to display a suggestion determined by suggestion determining unit 103 in a display method determined by display method determining unit 105. Suggestion display control unit 106 is an example of a "display control unit" according to the present invention. Suggestion display control unit 106, in the present embodiment, causes touch screen 16, which is an example of the display means, of smartphone 10 to display the suggestion in the determined display method. Examples of display methods in which a suggestion is displayed by suggestion display control unit 106 will be described with reference to FIGS. 6 to 8.

FIG. 6 shows an example of a suggestion button display. In a display method shown in FIG. 6(a), suggestion display control unit 106, upon start of a translation application, causes suggestion button H11 to appear on translation application screen A1. Suggestion button H11 is a circular image indicating an exclamation mark. Translation application screen A1 includes operation images "translation," "history," "dictionary," and "settings," which are arranged such that they can be selected even after suggestion button H11 is displayed.

When a user performs an operation (for example, a tap operation) to select suggestion button H11, suggestion display control unit 106 causes suggestion H12 corresponding to suggestion button H11 to be displayed, as shown in FIG. 6(b). Suggestion H12 shows a message "Suggestion: Enter English/Japanese sentences in the input field and press "translation" to display translated sentences," which is a suggestion "method of using basic functions" shown in FIG. 4 for a beginner who has started the translation application. Suggestion button H11 is information indicating existence of a suggestion such as suggestion H12. Suggestion button H12 is an example of support information that supports a user in operating the user device, as in the case of a suggestion itself.

In translation application screen A1, operation images B11 are arranged such that they can be selected even after suggestion H12 is displayed. Suggestion H12 is a suggestion that appears after a user performs an operation (selection of suggestion button H11), and that does not prevent the user from operating a displayed screen (translation application screen A1).

Suggestion H12 includes a message "do not show this suggestion again" and confirmation information C1 for confirming necessity of a suggestion by use of "yes" and "no" button images. When a user selects the "yes" button image, suggestion display control unit 106, for example, may cause another suggestion of "method of using basic functions" to be displayed, instead of suggestion H12, in response to future selection of suggestion button H11.

When a user selects the "yes" or "no" button image, suggestion display control unit 106 terminates the display of suggestion H12. Alternatively, when the user touches the display somewhere other than confirmation information C1 of suggestion H12, suggestion display control unit 106 terminates the display of suggestion H12 and causes suggestion button H11 to reappear. Namely, the user is able to switch between suggestion button H11 and suggestion H12. However, suggestion display control unit 106 terminates the display of suggestion button H11 after a certain period of time (for example, 10 seconds) has elapsed after suggestion button H11 was displayed.

FIG. 7 shows an example of an overlapping suggestion display. FIG. 7(a) shows video browsing site A2 displayed on touch screen 16. In a display method shown in FIG. 7(b), suggestion display control unit 106 causes suggestion H12 to appear on top of video browsing site A2. Suggestion H21 shows a message "Suggestion: Storage capacity is getting low. How about deleting data?," which is a suggestion "suggestion of deleting data" shown in FIG. 4 for a beginner whose device has a remaining storage capacity reduced to less than 10%. Suggestion H21 includes confirmation information C1 for confirming necessity of a suggestion.

Video browsing site A2 includes operation images such as search bar B21 and links B22 to a video. These operation images are arranged such that they can be selected even after suggestion H21 is displayed. Suggestion 21 is a suggestion that appears when a trigger has occurred, without a user's operation, and that does not prevent a user from operating a displayed screen (video browsing site A2). When a user selects the "yes" or "no" button image, or touches the display somewhere other than confirmation information C1 of suggestion H21, suggestion display control unit 106 terminates the display of suggestion H21. Suggestion display control unit 106 does not terminate the display of suggestion H21 unless such an operation is performed, unlike the case of suggestion button H11.

Figure 8:
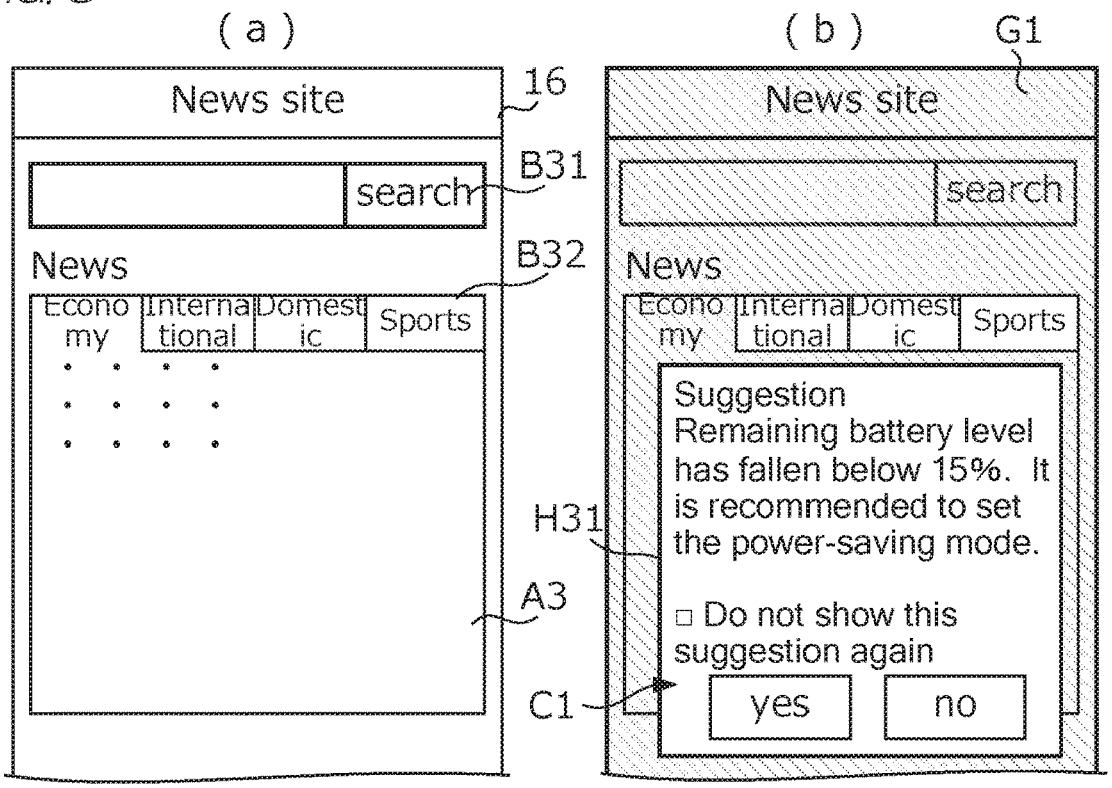
FIG. 8 is a diagram showing an example of an overlapping-suggestion and operation-restrictive display.

FIG. 8 shows an example of an overlapping-suggestion and operation-restrictive display. FIG. 8(a) shows news site A3 displayed on touch screen 16. In a display method shown in FIG. 8(b), suggestion display control unit 106 causes suggestion H31 to appear on top of news site A3. Suggestion H31 shows a message "Suggestion: Remaining battery level has fallen below 15%. It is recommended to set the power-saving mode," which is a suggestion "alert and suggestion of setting power-saving mode" shown in FIG. 4 for a beginner whose remaining battery level is reduced to less than 15%. Suggestion H31 includes confirmation information C1 for confirming necessity of a suggestion.

News site A3 includes operation images such as search bar B31 and tabs B32 for news genres (economy, international, domestic, and sports). Suggestion display control unit 106 prevents these operation images from being selected while suggestion H31 is displayed. To enable a user to understand intuitively that the operation images can be selected, suggestion display control unit 106 displays semi-transparent gray screen G1 on top of news site A3. Suggestion H31 is a suggestion that appears when a trigger has occurred, without a user's operation, and that prevents a user from operating a displayed screen (news site A3).

When a user selects the "yes" or "no" button image, or touches the display somewhere other than confirmation information C1 of suggestion H31, suggestion display control unit 106 terminates the display of suggestion H31 and gray screen G1. Suggestion display control unit 106 does not terminate the display of suggestion H31 unless such an operation is performed, as in the case of suggestion H21. After the display of suggestion H31 and gray screen G1 ends, the operation images included in news site A3 become selectable again.

As described in the foregoing, the display methods "suggestion button display," "overlapping suggestion display," and "overlapping-suggestion and operation-restrictive display" differ from each other in a method in which a user may operate smartphone 10 (user device) after a suggestion is displayed. For example, in the display method "suggestion button display," a user may switch a suggestion to a suggestion button as described above with reference to FIG. 6; in contrast, in the other two display methods, a user cannot perform such an operation since a suggestion button is not displayed.

In another example, in the display method "overlapping-suggestion and operation-restrictive display," a user needs to terminate display of a suggestion to operate a screen displayed behind the suggestion; in contrast, in the other two display methods, a user is able to operate a screen displayed behind a suggestion, without terminating display of the suggestion (namely, even while the suggestion is displayed). As described in the foregoing, the three display methods differ in an operation performed relative to a suggestion (for example, an operation of selecting "yes" or "no" relative to a suggestion), in whether a suggestion and a suggestion button can be switched therebetween, and in whether a background screen can be operated. It is to be noted that the three display methods may have one or more other differences, according to an operation method of smartphone 10 (for example, whether a voice instruction is allowed).

Display method determining unit 105, as described in the foregoing, determines, based on a suggestion type, one of the display methods that differ in a method in which a user may operate smartphone 10 after a suggestion is displayed: namely, suggestion button display, in which a switching operation and a background screen operation are allowed; overlapping suggestion display, in which a switching operation is not allowed and a background screen operation is allowed; or overlapping-suggestion and operation-restrictive display, in which neither a switching operation nor a background screen operation is allowed.

Smartphone 10 (specifically, CPU 11) described in the foregoing performs a process for determining a proficiency level and a process for displaying a suggestion.

Figure 9:
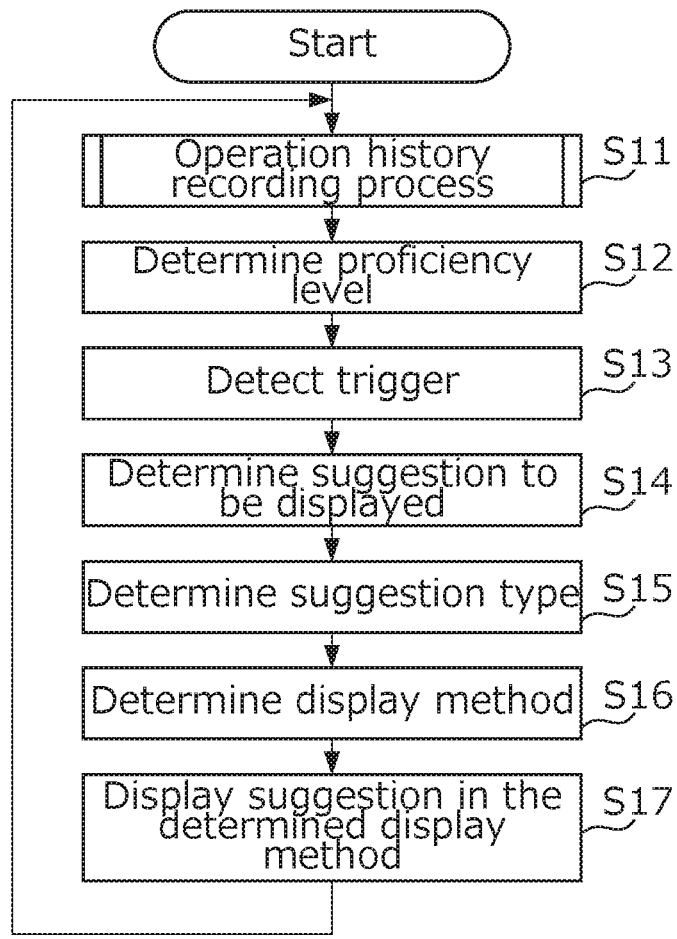
FIG. 9 is a diagram showing an example of an operation procedure of a determination process and a display process.

FIG. 9 shows an example of an operation procedure of the determination process and the display process. The operation starts in response to activation of smartphone 10. Initially, smartphone 10 (proficiency level determining unit 101) performs an operation history recording process for recording an operation history, while smartphone 10 is operating (step S11).

Subsequently, smartphone 10 (proficiency level determining unit 101) determines a user's proficiency level in operating the user device based on the recorded operation history (step S12). Subsequently, smartphone 10 (display trigger determining unit 102) determines whether a trigger has occurred (step S13). Subsequently, smartphone 10 (suggestion determining unit 103) determines a suggestion to be displayed, based on the determined proficiency level and the trigger that has occurred (step S14).

Subsequently, smartphone 10 (suggestion type determining unit 104) determines a type of the determined suggestion (step S15). Subsequently, smartphone 10 (display method determining unit 105) determines a display method based on the determined suggestion type (step S16). Subsequently, smartphone 10 (suggestion display control unit 106) causes the suggestion to be displayed using the determined display method (step S17).

For example, suggestion button H11 is displayed as shown in FIG. 6. Suggestion button H11 is a small image not showing a suggestion so that the button does not hinder a user's operation so much; however, suggestion button H11 and suggestion H12 are likely to be overlooked. In another example, suggestion H31 and gray screen G1 are displayed. Suggestion H31 and gray screen G1 prevent a user from operating an object other than the suggestion so that the user is sure to notice the suggestion; however, since the suggestion and the gray screen temporarily hinder the user from operating a background screen, the suggestion needs to be important to the user (otherwise, the suggestion is merely a hindrance to a user's operation).

In another example, suggestion H21 is displayed. This display method falls between the above two display methods in terms of noticeability and a degree of hindrance. As described in the foregoing, a display method in which a suggestion is noticeable is likely to hinder a user's operation, and a display method that does not hinder a user's operation is likely to lead to a user overlooking support information. A trade-off is established between noticeability and a degree of hindrance. Accordingly, it is desirable to use a display method selectively according to importance of a suggestion to be displayed.

In the present embodiment, an urgency level of a suggestion is used as a suggestion type. A suggestion having a high urgency is displayed in the most noticeable display method, a suggestion having a low urgency is displayed in the least distracting display method, and a suggestion having a middle urgency is displayed in the intermediate display method. Namely, in the present embodiment, it is possible to selectively use display methods of a suggestion that is user support information.

Second Embodiment

A second embodiment of the present invention will be described below. The differences between the present embodiment and the first embodiment will mainly be described. In the first embodiment, a display method is determined based on only a suggestion type; in contrast, in the second embodiment, a display method is determined based on not only a suggestion type but also a state of a user device. The state of a user device herein refers to an operation state of a user device and an execution state of a program. Below, an embodiment in which both the states are referred to will be described.

Operation State

Figure 10:
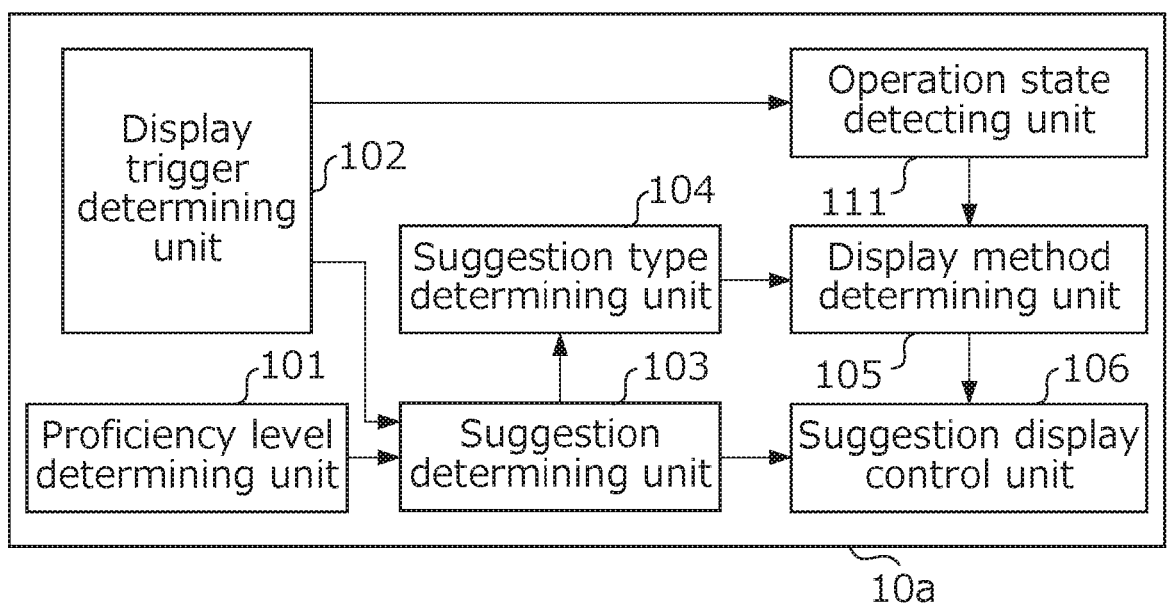
FIG. 10 is a diagram showing an example of a functional configuration provided in a second embodiment.

FIG. 10 shows an example of a functional configuration provided in the second embodiment. FIG. 10 shows smartphone 10a including operation state detecting unit 111 in addition to the functions shown in FIG. 2. Operation state detecting unit 111 detects a state of an operation (hereinafter referred to as "operation state") of a user device. Operation state detecting unit 111 is an example of a "first detecting unit" according to the present invention. Operation state detecting unit 111 receives a notification from display trigger determining unit 102 that has determined that a trigger has occurred, and on receipt of the notification, detects an operation state.

Operation state detecting unit 111 detects, for example, an operation state of digital camera 17 shown in FIG. 1, as a particular operation state. Specifically, operation state detecting unit 111 records an operation history of digital camera 17 (for example, an operation to activate digital camera 17, an operation to change settings, and an operation to release the shutter), and on receiving a notification from display trigger determining unit 102 that has detected a trigger, checks whether a record of operation has been stored during a predetermined time period (for example, about one to five minutes) (hereinafter referred as "detection period") prior to the receipt of the notification.

In a case where a record of operation has been stored during the detection period, operation state detecting unit 111 determines that digital camera 17 is in an in-operation state in which the digital camera is being used, and in the other case where no record of operation has been stored during the detection period, determines that the digital camera is in a non-operation state in which the digital camera is not being operated. On detecting an operation state, operation state detecting unit 111 notifies the detected operation state to display method determining unit 105.

Display method determining unit 105 determines a display method based on not only a suggestion type determined by suggestion type determining unit 104, but also an operation state detected by operation state detecting unit 111. Display method determining unit 105, for example, may pre-store a display method table associating a suggestion type, an operation state, and a display method, and determine a display method by use of the display method table.

FIG. 11 shows an example of the display method table according to the present embodiment. In the display method table, a suggestion type "urgency level: low" is associated with a set of an operation state "in-operation state" and a display method "no display," and with another set of an operation state "non-operation state" and a display method "suggestion button display." The display method "no display" herein refers to displaying neither a suggestion nor a suggestion button. Another suggestion type "urgency level: middle" is associated with a set of an operation state "in-operation state" and a display method "suggestion button display," and with another set of an operation state "non-operation state" and a display method "overlapping suggestion display."

Another suggestion type "urgency level: high" is associated with a set of an operation state "in-operation state" and a display method "overlapping suggestion display," and with another set of an operation state "non-operation state" and a display method "overlapping-suggestion and operation-restrictive display." Display method determining unit 105 identifies a display method associated with a suggestion type notified by suggestion type determining unit 104 and an operation state notified by operation state detecting unit 111 in the display method table.

According to the display method table shown in FIG. 11, in a non-operation state, a suggestion is displayed using a display method similar to that shown in FIG. 5; however, in an in-operation state, a suggestion is displayed using a display method less distracting than that shown in FIG. 5. When an urgency level is high, a display method "overlapping suggestion display" is selected instead of "overlapping-suggestion and operation-restrictive display," and when an urgency level is middle, a display method "suggestion button display" is selected instead of "overlapping suggestion display."

When an urgency level is low and digital camera 17 is in an in-operation state, no suggestion is displayed, so that a user's operation is not hindered. As for a suggestion having a low urgency, it is sufficient to display it when another identical trigger occurs in a non-operation state. As described in the foregoing, according to the display method table shown in FIG. 11, a less distracting display method is selected while digital camera 17 is being operated, so that a user is able to operate the user device more comfortably, compared with a case where a suggestion is displayed without consideration of an operation state.

It is to be noted that operation state detecting unit 111 may detect a particular operation state other than an operation state of digital camera 17, such as an operation state of a telephone function or an operation state of an email function. Alternatively, operation state detecting unit 111 may detect states of all operations performed on the user device, not only a particular operation state. In that case, display method determining unit 105 may determine a display method by use of the display method table shown in FIG. 11 such that a suggestion is less distracting in an in-operation state than in a non-operation state, and that a suggestion is more noticeable in a non-operation state than in an in-operation state.

Execution State

FIG. 12 shows another example of a functional configuration provided in the second embodiment. FIG. 12 shows smartphone 10b including execution state detecting unit 112 in addition to the functions shown in FIG. 2. Execution state determining unit 112 detects an execution state of a program in the user device. Execution state determining unit 112 is an example of a "second detecting unit" according to the present invention. Execution state determining unit 112 receives a notification from display trigger determining unit 102 that has determined that a trigger had occurred.

On receipt of the notification, execution state determining unit 112 detects an execution of a program. Execution state determining unit 112 detects, for example, an execution state of a particular application program (hereinafter referred to as "particular application") such as a translation application. Specifically, on receiving a notification from display trigger determining unit 102 that has detected a trigger, execution state determining unit 112 inquires of an OS (Operating System) of smartphone 10b about which programs are running.

In a case where the particular application is included in the running programs notified by the OS, execution state determining unit 112 determines that the particular application is in a running state, and in the other case, where the particular application is not included in the running programs, determines that the particular application is in a non-execution state in which the application is not running. On detecting an execution state of the particular application, execution state determining unit 112 notifies the detected execution state to display method determining unit 105.

Display method determining unit 105 determines a display method based on not only a suggestion type determined by suggestion type determining unit 104, but also a program execution state detected by execution state determining unit 112. Display method determining unit 105, for example, may pre-store a display method table associating a suggestion type, an execution state, and a display method, and determine a display method by use of the display method table.

FIG. 13 shows an example of the display method table according to the present embodiment. The display method table differs from the display method table shown in FIG. 11 in that an item "execution state" replaces "operation state," a state "running state" replaces "in-operation state," and a state "non-execution state" replaces "non-operation state." Display method determining unit 105 identifies a display method associated with a suggestion type notified by suggestion type determining unit 104 and an execution state notified by execution state determining unit 112 in the display method table.

According to the display method table shown in FIG. 13, a less distracting display method is selected while the particular application is running, so that a user is able to operate the user device more comfortably, compared with a case where a suggestion is displayed without consideration of an execution state. It is to be noted that execution state determining unit 112 may detect execution states of all applications stored in the user device, not only a particular operation state. In that case, display method determining unit 105 may determine a display method by use of the display method table shown in FIG. 13 such that a suggestion is less distracting in a running state than in a non-execution state, and that a suggestion is more noticeable in a non-execution state than in a running state.

It is also to be noted that in either of a case where an operation state is considered or a case where an execution state is considered, display method determining unit 105 may determine a display method other than those described above. For example, in an in-operation state in which an operation requiring a lot of power is in progress, or in a running state in which a particular application requiring a lot of power is running, display method determining unit 105 may determine a more noticeable display method than in a non-operation state or non-execution state. As a result, a user is likely to notice and adopt a suggestion, compared with a case where a display method is determined without consideration of an operation state or execution state. For example, in a case where a suggestion is displayed when a remaining battery level has fallen below 15%, it is likely that a user will perform an operation to avoid battery exhaustion.

It is also to be noted that display method determining unit 105 may determine a display method based on three or more operation states, instead of the two operation states "in-operation state" and "non-operation state." For example, display method determining unit 105 may determine a display method based on four operation states including a high operation-frequency state, a middle operation-frequency state, a low operation-frequency state, and a non-operation state. Alternatively, display method determining unit 105 may determine a display method based on three or more execution states, instead of the two execution states "running state" and "non-execution state." For example, display method determining unit 105 may determine a display method based on three executions states including a state in which a predetermined time has passed since start of a particular application, a state in which the predetermined time has not passed since start of the particular application, and a state in which the particular application has not been started. In any of these cases, it is possible to display a suggestion in a display method according to an operation state or execution state.

Third Embodiment

A third embodiment of the present invention will be described below. The differences between the present embodiment and the above two embodiments will be mainly described. In the above two embodiments, a single display control of a suggestion is performed; in contrast, in the third embodiment, a smartphone includes a multi-task function of running different applications simultaneously, and of selectively displaying their screens, so that plural display controls of a suggestion are simultaneously performed. Below, two methods of display control of a suggestion will be described.

Control of not Displaying Similar Suggestion

Figure 14:
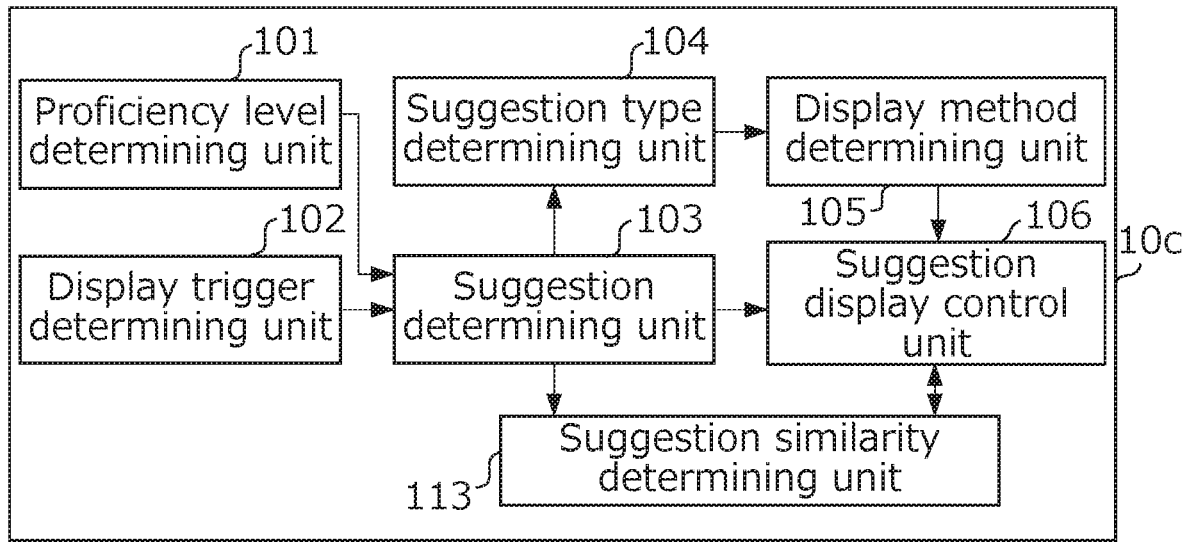
FIG. 14 is a diagram showing an example of a functional configuration provided in a third embodiment.

FIG. 14 shows an example of a functional configuration provided in the third embodiment. FIG. 14 shows smartphone 10c including suggestion similarity determining unit 113 in addition to the functions shown in FIG. 2. Suggestion similarity determining unit 113 is notified of a suggestion determined by suggestion determining unit 103 to be displayed.

Suggestion display control unit 106 performs plural display controls of a suggestion simultaneously. Suggestion display control unit 106, for example, when a trigger occurs while application screen A is being displayed, causes suggestion a to be displayed, and when a trigger occurs while application screen B that can be switched with application screen A is being displayed, causes suggestion b to be displayed. After application screen B is displayed, when application screen B is switched to application screen A, suggestion display control unit 106 causes suggestion a to be displayed again, together with application screen A. Suggestion display control unit 106 notifies a suggestion (in the present example, each of suggestions a and b) to suggestion similarity determining unit 113 each time suggestion display control unit 106 causes a suggestion to be displayed.

Suggestion similarity determining unit 113 determines whether a suggestion determined to be displayed is similar to a displayed suggestion. Suggestion similarity determining unit 113 is an example of a "similarity determining unit" according to the present invention. The displayed suggestion herein includes a suggestion that has disappeared. Suggestion similarity determining unit 113 stores data on suggestions notified by suggestion display control unit 106 as displayed suggestion data. On acquiring a suggestion from suggestion determining unit 103, suggestion similarity determining unit 113 calculates a level of similarity between the suggestion and each of the recorded suggestions.

For example, suggestion similarity determining unit 113 calculates a level of similarity between sentences of two suggestions by use of a well-known technique such as tf-idf (term frequency-inverse document frequency). In a case where the calculated similarity level is equal to or greater than threshold value Th1, suggestion similarity determining unit 113 determines that a new suggestion is similar to a displayed suggestion, and in the other case, where the calculated similarity level is less than threshold value Th1, suggestion similarity determining unit 113 determines that a new suggestion is not similar to a displayed suggestion. After determining a similarity level, suggestion similarity determining unit 113 notifies the similarity level to suggestion display control unit 106.

It is to be noted that displayed suggestions may not include suggestions that have disappeared. To apply such a modification, suggestion display control unit 106 notifies a suggestion that has disappeared to suggestion similarity determining unit 113, and suggestion similarity determining unit 113 deletes the suggestion from recorded displayed suggestions. As a result, suggestion similarity determining unit 113 determines whether a suggestion to be displayed is similar to a currently displayed suggestion.

Suggestion display control unit 106 does not cause the display means of the user device to display a suggestion determined by suggestion similarity determining unit 113 to be similar to a displayed suggestion. After acquiring a suggestion from suggestion determining unit 103, suggestion display control unit 106 awaits a determination of suggestion similarity determining unit 113, and when the determination indicates that the suggestion is not similar to any displayed suggestions, causes the suggestion to be displayed, and when the determination indicates that the suggestion is similar to a displayed suggestion, refrains from causing the suggestion to be displayed.

In the present embodiment, suggestion display control unit 106 includes a function of displaying a list of displayed suggestions in response to a user's instruction. If the user selects a suggestion from the suggestion list, suggestion display control unit 106 causes details of the selected suggestion to be displayed. This function is provided to enable a user to search for a target suggestion from among displayed suggestions.

Figure 15:
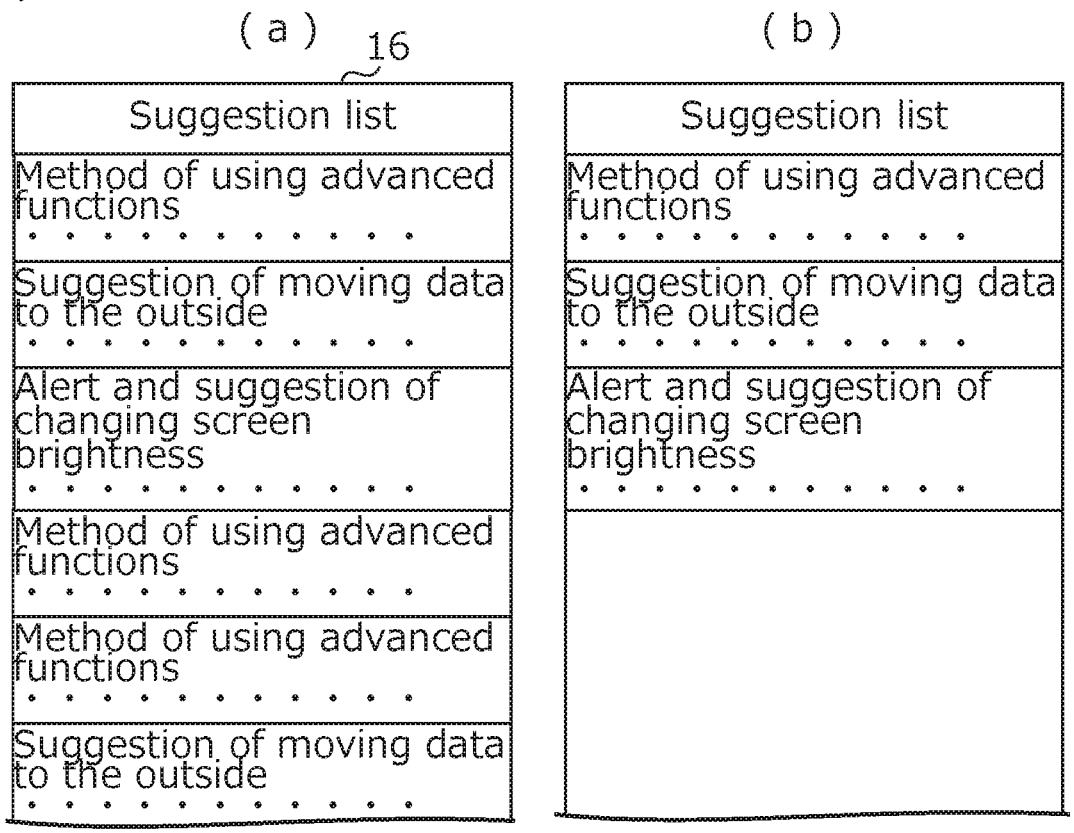
FIG. 15 is a diagram showing a list of displayed suggestions.

FIG. 15 shows an example of a list of displayed suggestions, which shows a title and a part of sentence for each suggestion such as "method of using advanced functions," "suggestion of moving data to the outside," and "alert and suggestion of changing screen brightness."

FIG. 15(a) shows a suggestion list displayed in a case where display control of a suggestion according to the present embodiment is not performed. The suggestion list shows similar suggestions (for example, "method of using advanced functions" and "suggestion of moving data to the outside") redundantly. FIG. 15(b) shows a suggestion list displayed in the other case, where display control of a suggestion according to the present embodiment is performed.

In the other case, suggestion display control unit 106 refrains from causing similar suggestions to be displayed, whereby the suggestion list shows only a single item for each suggestion "method of using advanced functions," "suggestion of moving data to the outside," and "alert and suggestion of changing screen brightness." Accordingly, a user is able to find his/her target suggestion more easily than in a case where similar suggestions are redundantly displayed.

It is to be noted that suggestion display control unit 106 may not include the function of displaying a suggestion list. In a case where the function is omitted, a user may search for his/her target suggestion by switching application screens. When doing so, the user may skip application screens showing no suggestion, so that s/he is able to find his/her target suggestion more easily than in a case where similar suggestions are redundantly displayed.

Determining Whether to Display Similar Suggestion

Figure 16:
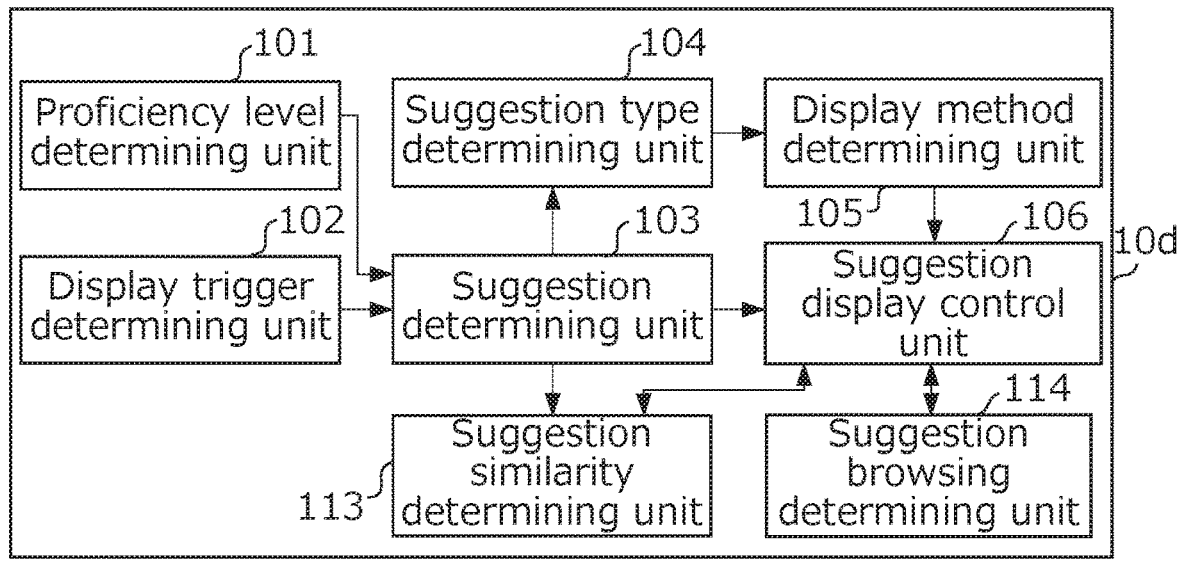
FIG. 16 is a diagram showing another example of a functional configuration provided in the third embodiment.

FIG. 16 shows an example of a functional configuration provided in the third embodiment. FIG. 16 shows smartphone 10d including suggestion browsing determining unit 114 in addition to the functions shown in FIG. 14. Suggestion browsing determining unit 114 acquires a suggestion caused to be displayed by suggestion display control unit 106.

Suggestion browsing determining unit 114 determines whether a suggestion caused to be displayed by suggestion display control unit 106 has been browsed by a user. Suggestion browsing determining unit 114 is an example of a "browsing determining unit" according to the present invention. Suggestion browsing determining unit 114, for example, after a suggestion button is displayed, monitors whether the suggestion button has been selected, and when the suggestion button has been selected, determines that a suggestion has been browsed, and when the suggestion button has disappeared without being selected, determines that a suggestion has not been browsed.

Further, after a suggestion is displayed in a display method "overlapping suggestion display" or "overlapping-suggestion and operation-restrictive display," suggestion browsing determining unit 114 measures a time from start to finish of display control of a suggestion, and when the measured time is equal to or greater than threshold value Th2, determines that the suggestion has been browsed, and when the measured time is less than threshold value Th2, determines that the suggestion has not been browsed.

In addition, suggestion browsing determining unit 114 measures a time from start of display control of a suggestion until the suggestion is temporarily hidden by another application screen, and when the measured time is equal to or greater than threshold value Th3, determines that the suggestion has been browsed, and when the measured time is less than threshold value Th3, determines that the suggestion has not been browsed. Suggestion browsing determining unit 114 determines whether a suggestion has been browsed, in the above-mentioned manners, and notifies a result of a determination to suggestion display control unit 106.

When suggestion browsing determining unit 114 has determined that a displayed suggestion has not been browsed, suggestion display control unit 106 causes a suggestion that is determined to be similar to the displayed suggestion by suggestion similarity determining unit 113 to be displayed. For example, in a case where suggestion a being displayed is determined to be similar to suggestion b to be displayed, suggestion display control unit 106 of smartphone 10c does not cause suggestion b to be displayed; in contrast, suggestion display control unit 106 of smartphone 10d causes suggestion b to be displayed when it is determined that suggestion a has not been browsed. According to the display control, a user who has overlooked a displayed suggestion (for example, suggestion a) is given an opportunity to browse a suggestion (for example, suggestion b) similar to the displayed suggestion.

Fourth Embodiment

A fourth embodiment of the present invention will be described below. The differences between the present embodiment and the first embodiment will be mainly described. In the first embodiment, a display method is determined based on only a suggestion type; in contrast, in the fourth embodiment, a display method is determined based on not only a suggestion type but also information (hereinafter referred to as "user-related information") related to a user of a user device.

Figure 17:
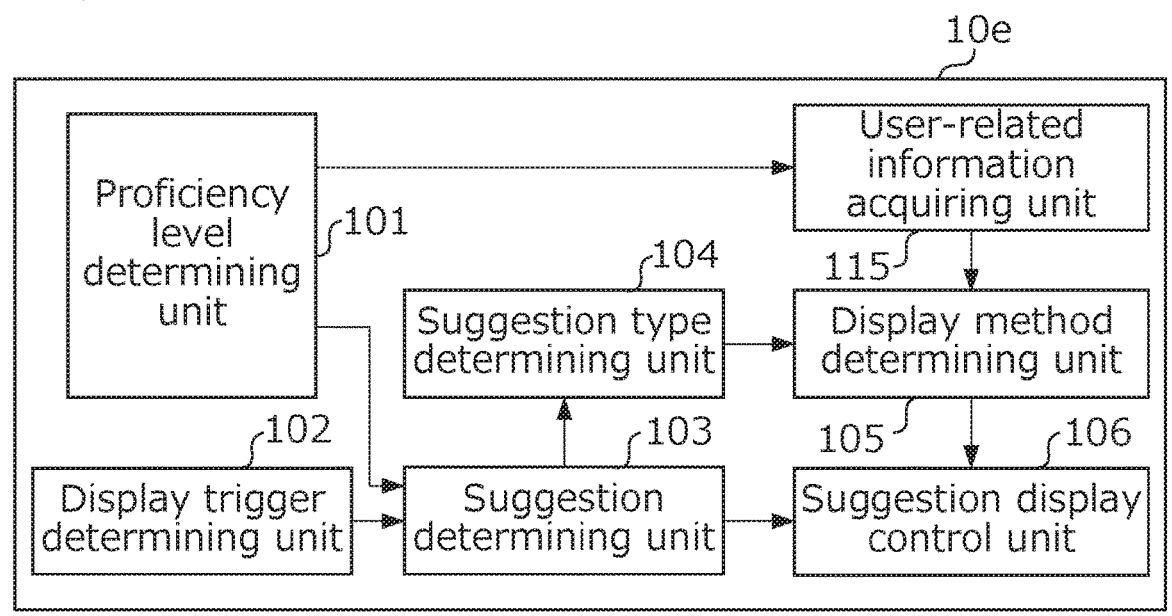
FIG. 17 is a diagram showing an example of a functional configuration provided in a fourth embodiment.

FIG. 17 shows an example of a functional configuration provided in the fourth embodiment. FIG. 17 shows smartphone 10e including user-related information acquiring unit 115 in addition to the functions shown in FIG. 2. User-related information acquiring unit 115 acquires a proficiency level determined by proficiency level determining unit 101.

User-related information acquiring unit 115 acquires user-related information. User-related information acquiring unit 115 is an example of an "acquiring unit" according to the present invention. User-related information acquiring unit 115 acquires, for example, a user's proficiency level from proficiency level determining unit 101 as user-related information. User-related information acquiring unit 115 provides the acquired user-related information to display method determining unit 105.

Display method determining unit 105 determines a display method based on not only a suggestion type determined by suggestion type determining unit 104 but also user-related information acquired by user-related information acquiring unit 115. Display method determining unit 105 determines a display method, for example, by use of a pre-stored display method table associating a suggestion type, user-related information (specifically, a proficiency level), and a display method.

FIG. 18 shows an example of the display method table. In the display method table, a suggestion type "urgency level: low" is associated with a set of user-related information "proficiency level: low" and a display method "overlapping suggestion display," with another set of user-related information "proficiency level: middle" and a display method "suggestion button display," and with another set of user-related information "proficiency level: high" and a display method "no display." Another suggestion type "urgency level: middle" is associated with a set of user-related information "proficiency level: low" and a display method "overlapping-suggestion and operation-restrictive display," with another set of user-related information "proficiency level: middle" and a display method "overlapping suggestion display," and with another set of user-related information "proficiency level: high" and a display method "suggestion button display."

Another suggestion type "urgency level: high" is associated with a set of user-related information "proficiency level: low" and a display method "overlapping-suggestion and operation-restrictive display," with another set of user-related information "proficiency level: middle" and a display method "overlapping-suggestion and operation-restrictive display," and with another set of user-related information "proficiency level: high" and a display method "overlapping suggestion display." Display method determining unit 105 identifies a display method associated with a suggestion type notified by suggestion type determining unit 104 and a proficiency level notified by user-related information acquiring unit 115 in the display method table as user-related information.

In general, users with a low proficiency level need suggestions, while users with a high proficiency level do not need suggestions to solve their problems. For users with a high proficiency level, it is important that suggestions do not hinder their operations. According to the display method table shown in FIG. 18, a user with a low proficiency level is provided with a noticeable suggestion, while a user with a high proficiency level is provided with a less distracting suggestion. Accordingly, a user is able to operate his/her user device comfortably, compared with a case where a suggestion is displayed without consideration of user-related information.

Fifth Embodiment

A fifth embodiment of the present invention will be described below. The differences between the present embodiment and the first embodiment will be mainly described. In the first embodiment, a display method is determined based on only a suggestion type; in contrast, in the fifth embodiment, a display method is determined based on not only a suggestion type but also a history (hereinafter referred to as "suggestion operation history") of user's operations in response to a displayed suggestion.

FIG. 19 shows an example of a functional configuration provided in the fifth embodiment. FIG. 19 shows smartphone 10f including suggestion operation history recording unit 116 in addition to the functions shown in FIG. 2. Suggestion operation history recording unit 116 acquires a notice from suggestion display control unit 106, indicating that a suggestion has been displayed.

Suggestion operation history recording unit 116 records a suggestion operation history. Suggestion operation history recording unit 116 is an example of a "recording unit" according to the present invention. Suggestion operation history recording unit 116 records a history of a user's operations on smartphone 10f as a suggestion operation history; for example, during a predetermined period after it is notified by suggestion display control unit 106 that a suggestion has been displayed.

Display method determining unit 105 determines a display method based on not only a suggestion type determined by suggestion type determining unit 104 but also a suggestion operation history recorded by suggestion operation history recording unit 116. For example, display method determining unit 105 calculates a degree (hereinafter referred to as "operation matching degree") of match between an operation indicated by a displayed suggestion and each of operations registered in the suggestion operation history, and determines a display method based on the calculated operation matching degrees. Display method determining unit 105 determines a display method; for example, by use of a pre-stored display method table associating a suggestion type, an operation matching degree, and a display method.

FIG. 20 shows an example of the display method table. In the display method table, a suggestion type "urgency level: low" is associated with a set of an operation matching degree "low" and a display method "overlapping suggestion display," with another set of an operation matching degree "middle" and a display method "suggestion button display," and with another set of an operation matching degree "high" and a display method "no display." The operation matching degrees "low," "middle," and "high" herein refer to, for example, an operation matching degree that is less than threshold value Th11, an operation matching degree that is equal to or greater than threshold value Th11 and less than threshold value Th12, and an operation matching degree that is equal to or greater than threshold value Th12, respectively.

Another suggestion type "urgency level: middle" is associated with a set of an operation matching degree "low" and a display method "overlapping-suggestion and operation-restrictive display," with another set of an operation matching degree "middle" and a display method "overlapping suggestion display," and with another set of an operation matching degree "high" and a display method "suggestion button display." Another suggestion type "urgency level: high" is associated with a set of an operation matching degree "low" and a display method "overlapping-suggestion and operation-restrictive display," with another set of an operation matching degree "middle" and a display method "overlapping-suggestion and operation-restrictive display," and with another set of an operation matching degree "high" and a display method "overlapping suggestion display."

Display method determining unit 105 determines a display method associated with a suggestion type notified by suggestion type determining unit 104 and an operation matching degree calculated based on the suggestion operation history recorded by suggestion operation history recording unit 116, in the display method table. In the present embodiment, a user with a higher matching degree is treated as a user with a higher proficiency level, and a display method is determined based on a user's proficiency level as in the case of the fourth embodiment. Accordingly, a user is able to operate his/her user device comfortably, compared with a case where a suggestion is displayed without consideration of a suggestion operation history.

Modified Examples

The above embodiments are merely examples of possible embodiments of the present invention, and may be modified as described below. The embodiments and the following modified examples may be combined with each other.

Display Method

A method in which a suggestion is caused to be displayed by suggestion display control unit 106 is not limited to the display methods described above. For example, suggestion display control unit 106 may cause a suggestion to be displayed using a display method "notification area display" in which a suggestion is displayed in an information notification area on a display surface of a display means. Alternatively, suggestion display control unit 106 may cause a suggestion to be displayed using a display method "large character size display" in which the character size is larger than normal, or using a display method "small character size display" in which the character size is smaller than normal.

Alternatively, suggestion display control unit 106 may cause a suggestion to be displayed using a display method "specific color display" in which characters and/or a background are represented in a specific color, or using a display method "animation display" in which characters and/or a background are moved or deformed. Alternatively, suggestion display control unit 106 may cause a suggestion to be displayed using a detailed display method in which the number of sentences and/or images is larger than normal, or using a simple display method in which the number of sentences and/or images is smaller than normal. As described in the foregoing, suggestion display control unit 106 may cause a suggestion to be displayed using any of various display methods that differ in the degree of noticeability of a suggestion, the degree of distraction to user's operation, and the amount of information to be notified to a user.

User-Related Information

The user-related information used in the fourth embodiment is not limited to the proficiency level described above. User-related information acquiring unit 115 may acquire, for example, a user's age as user-related information. When a user's age is acquired as user-related information, display method determining unit 105 may determine a display method in which the character size is larger as the acquired age is larger, since an older user is more likely to have difficulty in seeing small characters. A display method is determined based on a user's age such that every user is able to read a suggestion easily.

Alternatively, user-related information acquiring unit 115 may acquire a history of calls to a help desk as user-related information. The help desk herein refers to an entity that supports a user in operating his/her user device. When a history of calls to a help desk is acquired as user-related information, display method determining unit 105 may determine a detailed display method in which the number of sentences and/or images is larger as a call frequency is higher, and determine a simple display method in which the number of sentences and/or images is smaller as a call frequency is lower.

Alternatively, user-related information acquiring unit 115 may acquire information on a user's hobbies and/or interests as user-related information. When such information is acquired as user-related information, display method determining unit 105 may determine a display method in which a writing style, background, and/or character related to a user's hobbies and/or interests is used. For example, for a user interested in Japanese history, display method determining unit 105 may determine a display method in which a suggestion is displayed in a classical language, and for a user interested in English-speaking countries, display method determining unit 105 may determine a display method in which a suggestion is displayed partially using English.

In another example, for a user who likes fashion, display method determining unit 105 may determine a display method in which a background image related to fashion (for example, clothes or shoes) is displayed, and for a user who likes sports, display method determining unit 105 may determine a display method in which a background image related to sports (for example, a ball, a glove, or a racket) is displayed. By determining a display method depending on a user's hobbies and/or interests as described in the foregoing, a user is prompted to view a suggestion. According to the present modified example, no matter which of the items of user-related information described above is used, it is possible to display a suggestion using a display method pertinent to a user.

Suggestion Operation History

A method in which a display method is determined based on a suggestion operation history is not limited to the method according to the fifth embodiment. For example, display method determining unit 105 may determine a display method based on an amount (hereinafter referred to as "particular operation amount") of particular operations registered in a suggestion operation history. The particular operation herein refers to, for example, an operation to terminate display of a suggestion performed during a predetermined period after the suggestion is displayed. The particular operation amount herein is expressed as a ratio of the number of particular operations to the number of all operations registered in a suggestion operation history.

Display method determining unit 105 acquires a suggestion type from suggestion type determining unit 104, and refers to a suggestion operation history recorded by suggestion operation history recording unit 116 to calculate a particular operation amount. For example, display method determining unit 105 may determine a display method by use of a pre-stored display method table associating a suggestion type, a particular operation amount, and a display method.

FIG. 21 shows an example of the display method table. In the display method table, a suggestion type "urgency level: low" is associated with a set of a particular operation amount "not less than threshold value Th21" and a display method "no display," and another set of a particular operation amount "less than threshold value Th21" and a display method "suggestion button display." Another suggestion type "urgency level: middle" is associated with a set of a particular operation amount "not less than threshold value Th21" and a display method "suggestion button display," and another set of a particular operation amount "less than threshold value Th21" and a display method "overlapping suggestion display." Another suggestion type "urgency level: high" is associated with a set of a particular operation amount "not less than threshold value Th21" and a display method "overlapping suggestion display," and another set of a particular operation amount "less than threshold value Th21" and a display method "overlapping-suggestion and operation-restrictive display."

Display method determining unit 105 determines a display method associated with a suggestion type notified by suggestion type determining unit 104 and a particular operation amount calculated, in the display method table. According to the display method table shown in FIG. 21, a user who frequently clears a displayed suggestion immediately is provided with a suggestion displayed using a less distracting display method. The present modified example makes it possible to display a suggestion using a display method pertinent to a user.

It is to be noted that a particular operation is not limited to the particular operation described above, and may be an operation to change an application screen performed during a predetermined period after a suggestion is displayed using a display method with no restriction on user's operation. The predetermined period herein may be set to a time period (for example, one to two seconds) insufficient to browse a suggestion, such that the particular amount represents a frequency with which a user has overlooked a suggestion by changing an application screen without noticing or reading the suggestion.

Display method determining unit 105 calculates a particular operation amount, and determines a display method based on the calculated particular operation amount and a determined suggestion type. In determining a display method, display method determining unit 105 may determine a more noticeable display method as the calculated particular operation amount is larger, so that a user who frequently overlooks a suggestion is provided with a noticeable suggestion.

Device Providing Functions

The functions shown in figures including FIG. 2 may be provided in a device(s) different from the embodiments described above.

FIG. 22 shows a configuration of information-processing system 1 according to the present modified example, which includes network 2, smartphone 10g, and server device 20. Network 20 includes a mobile communication network and/or the Internet, and enables the devices to exchange data. Smartphone 10g accesses network 2 using mobile communication, and server device 20 accesses network 2 using a wired or wireless connection.

FIG. 23 shows a hardware configuration of server device 20, which is a computer including CPU 21, RAM 22, ROM 23, NIC (Network Interface Card) 24, and storage 25. CPU 21, RAM 22, and ROM 23 are hardware shared by smartphone 10 shown in FIG. 1. NIC 24 includes a circuit for making a wired or wireless connection to network 2 to communicate with smartphone 10g, for example. Storage 25 is a storage means such as a HDD (Hard Disk Drive) or an SSD (Solid State Drive), and stores data and programs used by CPU 21.

Figure 24:
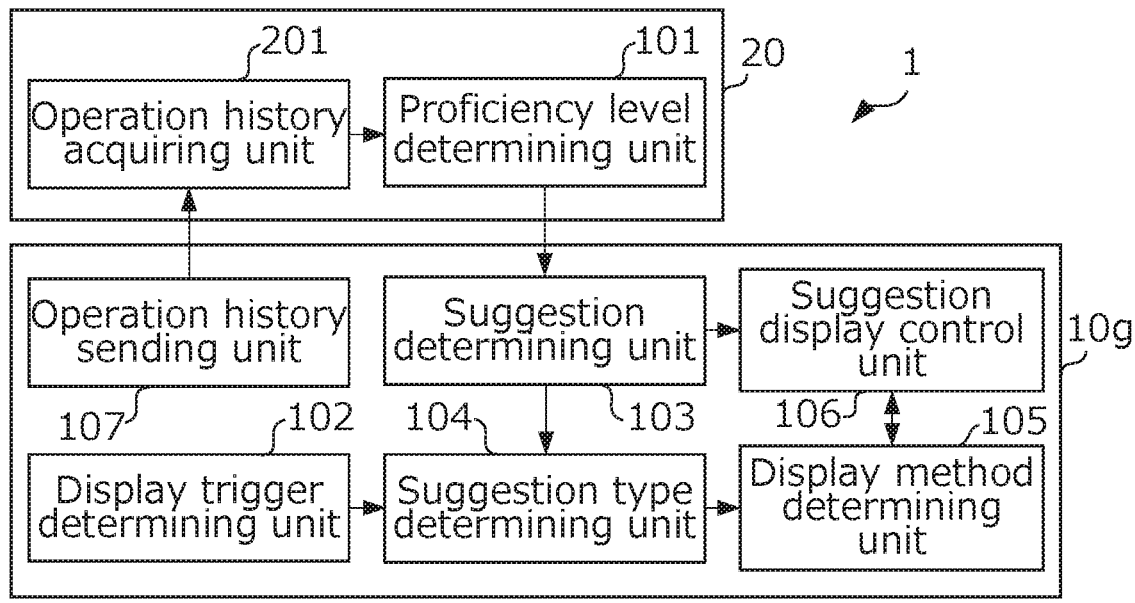
FIG. 24 is a diagram showing a functional configuration of an information-processing system.

FIG. 24 shows a functional configuration according to the present modified example. Smartphone 10g includes operation history sending unit 107, display trigger determining unit 102, suggestion determining unit 103, suggestion type determining unit 104, display method determining unit 105, and suggestion display control unit 106. Server device 20 includes operation history acquiring unit 201 and proficiency level determining unit 101. Operation history sending unit 107 sends a history of operations on smartphone 10g to server device 20. Operation history acquiring unit 201 acquires the sent operation history to provide it to proficiency level determining unit 101. Proficiency level determining unit 101 determines a user's proficiency level in operating the user device, based on the acquired operation history, and notifies the determined proficiency level to smartphone 10g. As described here, a determination of a proficiency level may be made in a device other than the user device.

As a modified example, the server device may include display trigger determining unit 102. Display trigger determining unit 102 included in the server device may detect a failure of an OS or application installed in the user device as a trigger, and send trigger information to the smartphone. As another modified example, the server device may include suggestion determining unit 103. Assuming that a suggestion responsive to a new failure is created, the suggestion needs to be stored only in the server device so as to be used. The suggestion does not need to be stored in each user device.

Figure 25:
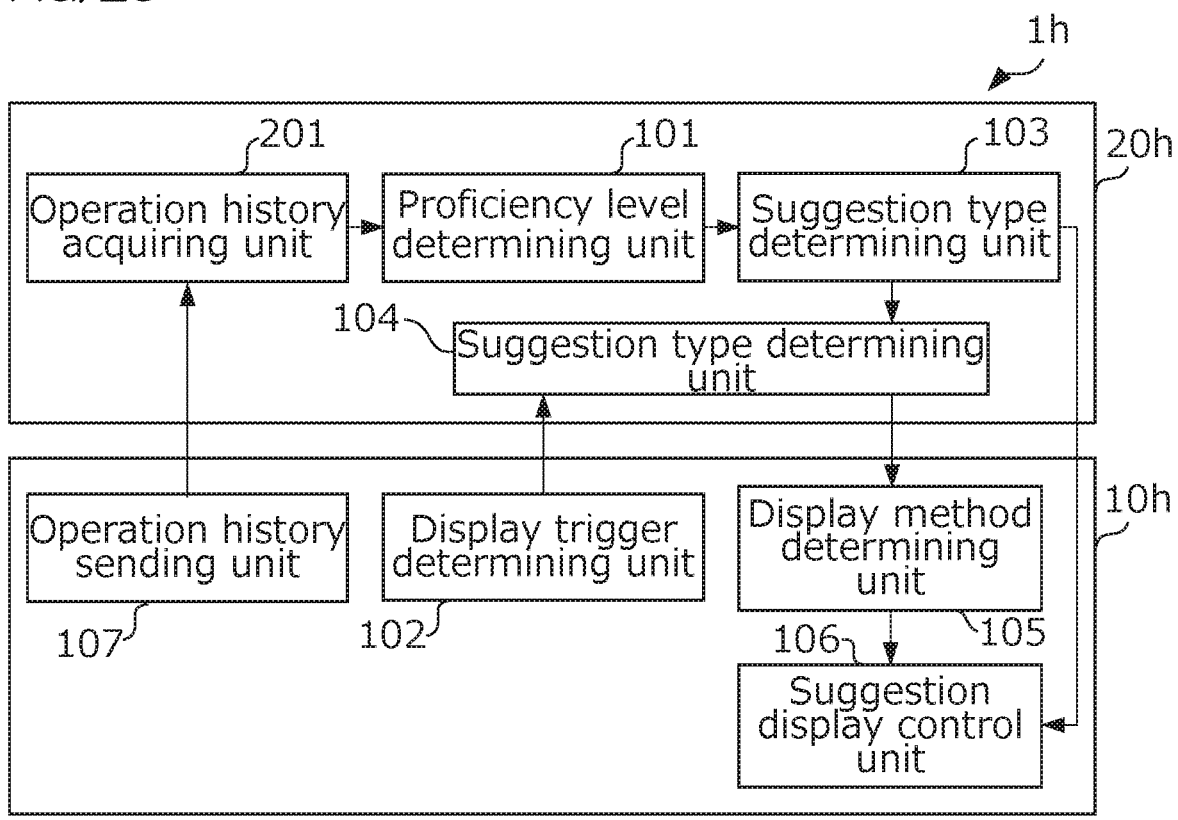
FIG. 25 is a diagram showing a functional configuration of an information-processing system.

FIG. 25 shows a functional configuration of information-processing system 1*h* according to the present modified example, which includes smartphone 10*h* and server device 20*h*. Smartphone 10*h* includes operation history sending unit 107, display trigger determining unit 102, display method determining unit 105, and suggestion display control unit 106. Server device 20*h* includes operation history acquiring unit 201, proficiency level determining unit 101, suggestion determining unit 103, and suggestion type determining unit 104. Smartphone 10*h* and server device 20*h* work together to determine a suggestion type, determine a display method, and control display of a suggestion. It is to be noted that server device 20*h* may include operation history acquiring unit 201, display method determining unit 105, and suggestion display control unit 106. A CPU of server device 20 including those units is an example of a "processing device" according to the present invention.

User Device

A user device is not limited to a smartphone, and may be a mobile phone, a tablet device, a notebook computer, or a desktop personal computer. In short, a user device may be any computer that can be operated by a user.

Display Means

A display means that is caused to display a suggestion by suggestion display control unit 106 is not limited to a display means provided in a user device, and may be an external display means. For example, in a case where a desktop personal computer is used as a user device, a display connected to the personal computer may be used as a display means. In another case, where a smartphone includes a function of enabling an external display means to display a screen, suggestion display control unit 106 may use the function to enable an external display means to display a suggestion.

Suggestion and Suggestion Type

A suggestion that is caused to be displayed by suggestion display control unit 106 is not limited to the suggestions described above. Suggestion display control unit 106 may cause a suggestion to be displayed notifying a failure of a user device or OS, or cause another suggestion to be displayed notifying how to fix a failure (for example, an introduction of an update or a program for fixing the failure).

Suggestion display control unit 106 may cause not only a suggestion described using a single screen, but also a suggestion described using plural screens, to be displayed. For example, suggestion display control unit 106 may cause a simple suggestion described using a single screen to be displayed for an advanced user, and cause a detailed suggestion described using plural screens to be displayed for a beginner. To enable such display control, display method determining unit 105 may determine, for example, a display method of a suggestion "method of using basic functions" among displays methods "single screen display," "three screens display," and "five screens display," which are different in the number of screens used to describe the suggestion.

A suggestion type is not limited to the urgency level described above. Other suggestion types may be used such as a suggestion type used to suggest a useful application or function by use of a message "(something) is useful!," a solution suggestion type used to suggest a solution to a problem or a preferred operation method by use of a message "are you having trouble with (something)?" or "would you like to do (something)?," or a warning type used to notify that a serious problem is occurring or has occurred, and to suggest a necessary solution.

If these suggestion types are used, display method determining unit 105 may determine a display method "suggestion button display" for a suggestion type suggestion, a display method "overlapping suggestion display" for a solution suggestion type suggestion, a display method "overlapping-suggestion and operation-restrictive display" for a warning type suggestion. In other examples of a suggestion type, suggestion types different in a probability that a suggestion is used may be used. If these suggestion types are used, display method determining unit 105 may determine a display method "overlapping-suggestion and operation-restrictive display" for a suggestion with a high probability, and a display method "suggestion button display" for a suggestion with a low probability. As described in the foregoing, various suggestion types may be used.

Control Performed when Suggestion is Displayed

When a suggestion is displayed, control other than display control may be performed. For example, control for causing a smartphone to vibrate, control for outputting a sound, or control for emitting a light may be performed when a suggestion is displayed. These controls help a user to notice a suggestion.

Support Information

Support information displayed on a user device is not limited to the suggestions described above, and may be information on how to use an application or hardware such as a help or a user guide, or be information from a user manual. In short, support information may be any information that supports a user in operating his/her user device.

Method of Using Proficiency Level

In the above embodiments, a proficiency level is used to display a suggestion; however, a proficiency level may be used for any other purpose. For example, items displayed on a menu screen may be selected based on a proficiency level. Specifically, the number of customizable items of screens or functions may be made larger in proportion to a proficiency level. Alternatively, the size of icons or characters may be made larger in inverse proportion to a proficiency level for a user's convenience. In short, a proficiency level may be used such that differences in a proficiency level cause a user device to perform different operations to the user's advantage.

Suggestion According to Time

Suggestion determining unit 103 may determine a suggestion based on not only a proficiency level and a trigger, but also a current time. For example, during the season for cherry blossom viewing, suggestion determining unit 103 may determine a suggestion related to cherry blossom viewing, as a suggestion to be displayed, such as a method for using an application or search site to search for cherry blossom viewing sites, and in other seasons, refrain from determining such a suggestion as a suggestion to be displayed.

Alternatively, during pre-dinner hours or pre-lunch hours of holidays, suggestion determining unit 103 may determine a method for accessing a food recipe site as a suggestion to be displayed, and during other hours, refrain from determining such a method as a suggestion to be displayed. Alternatively, during commuting hours when a user does not have enough time to read a suggestion, suggestion determining unit 103 may determine a simple suggestion as a suggestion to be displayed, and at night or during holidays at which time a user has enough time to read a suggestion, determine a detailed suggestion as a suggestion to be displayed. As described in the foregoing, a suggestion may be displayed according to a current time.

Display Method According to Time

Display method determining unit 105 may determine a display method based on not only a suggestion type but also a current time. For example, during the season of cherry blossom viewing, display method determining unit 105 may determine a display method in which a pink background is used to be suggestive to a user of cherry blossoms. This display method may cause the user to think about cherry blossom viewing, so that if the user is interested in cherry blossom viewing, s/he may pay attention to a suggestion, compared with a case where the suggestion is displayed without consideration of a time.

Alternatively, during commuting hours when a user does not have enough time to read a suggestion, display method determining unit 105 may determine a less distracting display method, and at night or during holidays when a user has enough time to read a suggestion, determine a noticeable display method. As described in the foregoing, a suggestion may be displayed using a display method according to a current time.

Category of Invention

The present invention may be implemented as a processing device such as a CPU of a smartphone or server device, or as an information-processing system including processing devices. In addition, the present invention may be implemented as an information-processing method for enabling a processing device to perform processing, or as a program for enabling a computer to control its components. This program may be distributed via a recording medium such as an optical disk, or may be downloaded and installed on a computer via a network such as the Internet.

DESCRIPTION OF REFERENCE NUMERALS

1 Information-processing system
2 Network
10 Smartphone
20 Server device
101 Proficiency level determining unit
102 Display trigger determining unit
103 Suggestion determining unit
104 Suggestion type determining unit
105 Display method determining unit
106 Suggestion display control unit
107 Operation history sending unit
111 Operation state detecting unit
112 Execution state determining unit
113 Suggestion similarity determining unit
114 Suggestion browsing determining unit
115 User-related information acquiring unit
116 Suggestion operation history recording unit
201 Operation history acquiring unit

What is claimed is:

1. A processing device, comprising:
a processor configured to:
detect an operation state of a digital camera of a user device;
determine a type of support information that supports a user in operating the user device, each type of the support information including one of a plurality of urgency levels indicative of the urgency of the type of support information;
determine a display method of the support information based on at least the urgency level of the determined type of the support information and the detected operation state of the digital camera; and
cause the support information to be displayed using the determined display method.

2. The processing device according to claim 1, wherein the processor is further configured to:
determine, based on the urgency level of the determined type, one of display methods that differ in a method by which the user may operate the user device after support information is displayed.

3. The processing device according to claim 1, wherein the processor is further configured to:
perform display controls of support information simultaneously;
determine whether support information determined to be displayed is similar to displayed support information; and
to refrain from causing support information determined to be similar to displayed support information by the similarity determining unit.

4. The processing device according to claim 3, wherein the processor is further configured to:
determine whether displayed support information has been browsed; and
cause support information to be displayed, the support information having been determined to be similar to displayed information, the displayed information having been determined not to have been browsed.

5. The processing device according to claim 1, wherein the support information is a suggestion in the operation of the user device.

6. The processing device according to claim 1, wherein the display methods include an icon to selectively display the support information, a display of the support information overlapping information displayed, and a display of the support information overlapping information displayed while restricting information displayed.

7. The processing device according to claim 1, wherein each of the display methods provides different degrees of hindrance in the operation of the user device to the user.

8. The processing device according to claim 1, wherein the display methods hinder the use of the user device to a degree based on the urgency level of the support information.

9. The processing device according to claim 8, wherein the greater the urgency level of the support information, the greater the display method hinders the use of the user device.

10. The processing device according to claim 1, wherein the display methods provide different degrees of noticeability to the user based on the urgency level of the support information.

11. The processing device according to claim 1, wherein the display methods provide different degrees of distraction to the user based on the urgency level of the support information.

12. The processing device according to claim 1, wherein the greater the urgency level of the support information, the greater the display method hinders the use of the user device.

13. The processing device according to claim 1, wherein the determination of the display method of the support information based on importance of the support information.

14. An information-processing system, comprising:
a server comprising a processor; and
a user device comprising a processor:
wherein at least one of the respective processors of the server and the user device is configured to:
detect an operation state of a digital camera of a user device;

determine a type of support information that supports a user in operating the user device, each type of the support information including one of a plurality of urgency levels indicative of the urgency of the type of support information; and wherein the processor of the user device is configured to:
determine a display method of the support information based on at least the urgency level of the determined type of the support information and the detected operation state of the digital camera; and cause the support information to be displayed using the determined display method.

15. A processing method, comprising:

detecting an operation state of a digital camera of a user device;

determining a type of support information that supports a user in operating the user device, each type of the support information including one of a plurality of urgency levels indicative of the urgency of the type of support information;

determining a display method of the support information based on at least the urgency level of the determined type of the support information and the detected operation state of the digital camera; and causing the support information to be displayed using the determined display method.

* * * * *